United States Patent
Ng et al.

(10) Patent No.: US 6,847,676 B1
(45) Date of Patent: Jan. 25, 2005

(54) ALL-LAG SPREAD-SPECTRUM CORRELATORS WITH ROTATING REFERENCES

(75) Inventors: Tung Sang Ng, Pokfulam (HK); Chin Long Cheng, Hong Kong (HK); Kun Wah Yip, Kowloon (HK)

(73) Assignee: University of Hong Kong, Hong Kong (HK)

( * ) Notice: Subject to any disclaimer, the term of this patent is extended or adjusted under 35 U.S.C. 154(b) by 939 days.

(21) Appl. No.: 09/607,647

(22) Filed: Jun. 30, 2000

Related U.S. Application Data

(60) Provisional application No. 60/141,732, filed on Jun. 30, 1999.

(51) Int. Cl.[7] .............................. H04B 1/69; H04B 1/707
(52) U.S. Cl. ....................... 375/142; 375/151; 375/152; 375/202; 342/357.12; 370/342; 324/77
(58) Field of Search ................................ 375/142, 152, 375/151, 202; 342/357.12; 370/342; 324/77

(56) References Cited

U.S. PATENT DOCUMENTS

| | | | | |
|---|---|---|---|---|
| 5,022,047 A | * | 6/1991 | Dixon et al. | 375/151 |
| 6,198,765 B1 | * | 3/2001 | Cahn et al. | 375/142 |
| 6,208,291 B1 | * | 3/2001 | Krasner | 342/357.12 |
| 6,289,041 B1 | * | 9/2001 | Krasner | 375/152 |
| 6,330,292 B1 | | 12/2001 | Dent et al. | |
| 6,611,512 B1 | | 8/2003 | Burns | |

* cited by examiner

Primary Examiner—Shuwang Liu
Assistant Examiner—Eva Y Zheng
(74) Attorney, Agent, or Firm—Jones Day

(57) ABSTRACT

An all-lag rotating-reference correlator correlates a received spread-spectrum signal with a rotating reference code, and produces in each sampling instance N correlation lags corresponding to the correlation of the received signal with $0, 1, \ldots, N-1$ lags (or delays) of the rotating reference code, wherein N is the length of the rotating reference code. The rotating reference code is time-variant and is generated by a rotation of a basic reference code. The received signal, possibly embedded in noise and interference, consists of periodic replicas of the basic reference code with or without data modulation. The first embodiment of the present invention describes a method and apparatus of an all-lag rotating-reference correlator which is applicable to situations where data modulation is not present in the received signal. The second embodiment of the present invention describes a method and apparatus of an all-lag rotating-reference correlator which is applicable for situations where data modulation is present in the received signal. Corresponding methods and apparatus are also described when only a number of selected correlation lags are required to be generated. Each apparatus comprises storage means for storing spread-spectrum signal samples, subtraction means, a plurality of multiplication means each of which computes the multiplication result for the output of subtraction means and an element of rotating reference code, storage means for storing correlation lags, and a plurality of addition means.

14 Claims, 9 Drawing Sheets

ALL-LAG SPREAD-SPECTRUM CORRELATORS WITH ROTATING REFERENCES

This application claims the benefit of Provisional Application No. 60/141,732, filed Jun. 30, 1999.

BACKGROUND

1. Field of the Invention

The present invention generally relates to spread-spectrum (SS) systems. In particular, the present invention relates to methods systems, and apparatus for correlating a received SS signal with all lags of a rotating reference code sequence and producing all correlation lags at a sampling instant.

2. Description of the Related Art

SS techniques have many applications such as multiple-access communications, secure communications, channel sounding, distance measurement and target identification using radars and sonars, and navigation using GPS and GLONASS. One of the essential elements in the implementation of SS systems is a correlator. A correlator is required at a SS receiver to initially acquire the incoming SS signal, as well as to perform other tasks such as code tracking, symbol and carrier clock recovery, demodulation of information systems, and channel estimation.

Commonly used forms of correlators include serial correlators, parallel correlators, banks of serial correlators, and all-lag correlators. An all-lag correlator correlates a stream of incoming data samples with 0, 1, . . . , N−1 lags of an N-length reference code sequence and produces a stream of all-lag even- or odd-correlation at a rate equal to the rate of incoming data samples. Since more correlation information is provided by all-lag correlators than other commonly used forms of correlators, some applications can take advantage of this additional correlation information.

Let $d_n$ denote the stream of incoming data samples and $\{c_0, c_1, , C_{N-1}\}$ be the reference code sequence. An all-lag correlator generates a stream of all-lag even-correlation vectors, $r'_n$, or a stream of all-lag odd-correlation vectors, $\bar{r}'_n$, every sampling instant, where $r'_n = [r'_{0,n}, r'_{1,n}, \ldots, r'_{N-1,n}]^T$ and $\bar{r}'_n = [\bar{r}'_{0,n}, \bar{r}'_{1,n}, \ldots, \bar{r}'_{N-1,n}]^T$ are given by $$r'_n = A d_n \quad (1)$$

and $$\bar{r}'_n = \bar{A} d_n \quad (2)$$

In the expressions, $r'_{m,n}$ and $\bar{r}'_{m,n}$ denote respectively the mth even- and odd-correlation lags obtained at time n, $$A = \begin{bmatrix} c_0 & c_1 & c_2 & \cdots & c_{N-2} & c_{N-1} \\ c_{N-1} & c_0 & c_1 & \cdots & c_{N-3} & c_{N-2} \\ c_{N-2} & c_{N-1} & c_0 & \cdots & c_{N-4} & c_{N-4} \\ \vdots & \vdots & \vdots & \ddots & \vdots & \vdots \\ c_2 & c_3 & c_4 & \cdots & c_0 & c_1 \\ c_1 & c_2 & c_3 & \cdots & c_{N-1} & c_0 \end{bmatrix} \quad (3)$$

and $$\bar{A} = \begin{bmatrix} c_0 & c_1 & c_2 & \cdots & c_{N-2} & c_{N-1} \\ -c_{N-1} & c_0 & c_1 & \cdots & c_{N-3} & c_{N-2} \\ -c_{N-2} & -c_{N-1} & c_0 & \cdots & c_{N-4} & c_{N-4} \\ \vdots & \vdots & \vdots & \ddots & \vdots & \vdots \\ -c_2 & -c_3 & -c_4 & \cdots & c_0 & c_1 \\ -c_1 & -c_2 & -c_3 & \cdots & -c_{N-1} & c_0 \end{bmatrix} \quad (4)$$

are N×N matrices, and $$d_n = [d_{n-(N-1)}, d_{n-(N-2)}, \ldots, d_{n-1}, d_n]^T \quad (5)$$

is a data vector containing the N most recent data samples. Correlation information in $r'_n$ and $\bar{r}'_n$, when processed, can be extracted for various purposes. The information provided by $r'_n$ is useful when the SS signal is composed of periodic repetition of the reference code sequence without data modulation. The information contained in $r'_n$ and $\bar{r}'_n$ is applicable when the SS signal is a data signal modulated with the entirety of the reference code.

Despite various advantages, the correlation peak of an all-lag correlator that generates $r'_n$ or $\bar{r}'_n$ shifts from output to output as the correlation vector is updated by newly received data samples. Shifting of the peak position increases the subsequent signal processing requirement for extracting useful information provided by the all-lag correlation. It is desirable to keep the peak position fixed in order to reduce the posterior signal processing requirement. Furthermore, keeping the peak position fixed enables more convenient manipulation of the correlation information in certain applications, such as estimation of the multipath channel profile in wireless communications and ranging in radar systems.

It is possible to overcome the peak-shifting problem by using all-lag correlators that employ rotating reference code sequences. Herein the correlators are referred to as all-lag rotating-reference correlators, and are different from the ones for generating $r'_n$ and $\bar{r}'_n$, in which fixed reference codes are used. An all-lag rotating-reference correlator that generates at time n an all-lag even-correlation vector $r_n = [r_{0,n}, r_{1,n}, \ldots, r_{N-1,n}]^T$, wherein $r_{m,n}$ is the mth even-correlation lag, is constructed as follows.

Define an N×N shift matrix S, where $$S = \begin{bmatrix} 0 & 0 & 0 & \cdots & 0 & 1 \\ 1 & 0 & 0 & \cdots & 0 & 0 \\ 0 & 1 & 0 & \cdots & 0 & 0 \\ \vdots & \vdots & \vdots & \ddots & \vdots & \vdots \\ 0 & 0 & 0 & \cdots & 0 & 0 \\ 0 & 0 & 0 & \cdots & 1 & 0 \end{bmatrix}. \quad (6)$$

Then $r_n$ is computed by $$r_n = C_n d_n \quad (7)$$

where $d_n$ is a data vector given by equation. (5), and $C_n$ is an N×N matrix constructed by $$C_0 = A$$

$$C_{n+1} = S C_n, n \geq 0 \quad (8)$$

It follows that $$C_n = S^n A, n \geq 0 \quad (9)$$

An all-lag rotating-reference correlator that generates at time n an all-lag odd-correlation vector $\bar{r}_n = [\bar{r}_{0,n}, \bar{r}_{1,n}, \ldots, \bar{r}_{N-1,n}]^T$, wherein $\bar{r}_{m,n}$ is the mth odd-correlation lag, is constructed as follows.

Define an N×N shift matrix $$\overline{S} = \begin{bmatrix} 0 & 0 & 0 & \cdots & 0 & -1 \\ 1 & 0 & 0 & \cdots & 0 & 0 \\ 0 & 1 & 0 & \cdots & 0 & 0 \\ \vdots & \vdots & \vdots & \ddots & \vdots & \vdots \\ 0 & 0 & 0 & \cdots & 0 & 0 \\ 0 & 0 & 0 & \cdots & 1 & 0 \end{bmatrix} \quad (10)$$

Then $\bar{r}_n$ is given by $$\bar{r}_n = \overline{C}_n d_n \quad (11)$$

where $\overline{C}_n$ is recursively generated by $$\overline{C}_0 = \overline{A}$$

$$\overline{C}_{n+1} = \overline{S}\overline{C}_n, \; n \geq 0 \quad (12)$$

Therefore, $$\overline{C}_n = \overline{S}^n \overline{A}, \; n \geq 0 \quad (13)$$

It can be shown that the reference code used to compute $r_n$ and $\bar{r}_n$ is time-variant and is a rotation of a basic reference code $c_0, c_1, , c_{N-1}$. The information provided by $r_n$ is useful when the SS signal is composed of periodic repetition of the basic reference code sequence without data modulation. The information altogether contained in $r_n$ and $\bar{r}_n$ is applicable when the SS signal is a data signal modulated with the entirety of the basic reference code.

The sequence of sets of all even-correlation lags, $r_n$, is generated at a rate equal to the rate of incoming SS signal samples $d_n$. It is obvious that a means for generating an all-lag even-correlation sequence can be implemented by means of N parallel correlators each of which, at time n, correlates SS signal samples with the rotating reference code given by a row of $C_n$. However, none of the prior art teaches or suggests a method or apparatus for correlating a received SS signal with a rotating reference code using one correlator (a) which has the number of outputs equal to N and (b) whose outputs at one sampling instant are all even-correlation lags for the incoming SS signal samples and are produced at a rate equal to the rate of the incoming SS signal samples.

In some applications, it is desirable to generate only part of N even-correlation lags every sampling instant. For example, consider the situation aabove. M (M<N) selected even-correlation lags are generated. It is obvious that a means for generating an M-even-correlation sequence can be implemented by means of M parallel correlators each of which, at time n, correlates SS signal samples with the rotating reference code given by a specified row of $C_n$. However, none of the prior art teaches or suggests a method or apparatus for correlating a received SS signal with a rotating reference code using one correlator (a) which has the number of outputs equal to M and (b) whose outputs at one sampling instant are M even-correlation lags for the incoming SS signal samples and are produced at a rate equal to the rate of the incoming SS signal samples.

The sequence of sets of all even-correlation lags, $r_n$, and the sequence of sets of all odd-correlation lags, $\bar{r}_n$, are generated at a rate equal to the rate of incoming SS signal samples $d_n$. It is obvious that a means for generating an all-lag even-correlation sequence can be implemented by means of N parallel correlators each of which, at time n, correlates SS signal samples with the rotating reference code given by a row of $C_n$. It is also obvious that a means for generating an all-lag odd-correlation sequence can be implemented by means of N parallel correlators each of which, at time n, correlates SS signal samples with a sequence specified by a row of $\overline{C}_n$. However, none of the prior art teaches or suggests a method or apparatus for correlating a received SS signal with a rotating reference code using one correlator (a) which has the number of outputs equal to N and (b) whose outputs at one sampling instant are all even-correlation lags for the incoming SS signal samples and are produced at a rate equal to the rate of the incoming SS signal samples. In addition, none of the prior art teaches or suggests a method or apparatus for correlating a received SS signal with a rotating reference code using one correlator (a) which has the number of outputs equal to N and (b) whose outputs at one sampling instant are all odd-correlation lags for the incoming SS signal samples and are produced at a rate equal to the rate of the incoming SS signal samples.

In some applications, it is desirable to generate only part of N even- and N odd-correlation lags every sampling instant. For example, consider the situation where M selected even- and M selected odd-correlation lags (M<N) are generated. It is obvious that a means for generating an M-even-correlation sequence can be implemented by means of M parallel correlators each of which, at time n, correlates SS signal samples with the rotating reference code given by a specified row of $C_n$. It is also obvious that a means for generating an M-odd-correlation sequence can be implemented by means of M parallel correlators each of which, at time n, correlates SS signal samples with a sequence specified by a specified row of $\overline{C}_n$. However, none of the prior art teaches or suggests a method or apparatus for correlating a received SS signal with a rotating reference code using one correlator (a) which has the number of outputs equal to M and (b) whose outputs at one sampling instant are M even-correlation lags for the incoming SS signal samples and are produced at a rate equal to the rate of the incoming SS signal samples. In addition, none of the prior art teaches or suggests a method or apparatus for correlating a received SS signal with a rotating reference code using one correlator (a) which has the number of outputs equal to M and (b) whose outputs at one sampling instant are M odd-correlation lags for the incoming SS signal samples and are produced at a rate equal to the rate of the incoming SS signal samples.

SUMMARY OF THE INVENTION

A first object of the invention is to provide a method and apparatus including a simple correlator for computing or generating all N even-correlation lags between a rotating reference code and a received SS signal, wherein (a) the rotating reference code is time-variant and is generated by a rotation of a basic reference code, (b) the SS signal is a signal, possibly corrupted by noise and interference, composed by means of periodic repetition of a pseudo-noise (PN) sequence, and (c) the correlator has N outputs and generates all N even-correlation lags once every sampling instant. Such an apparatus can be used for SS systems employing, for example, binary-phase-shift-keying (BPSK) signals, or code-phase-shift-keying (CPSK) signals, each without data modulation., A second object of the invention is to provide an apparatus including a plurality of correlators, for correlating a plurality of streams of SS signal samples with a rotating reference code, wherein (a) the rotating reference code is time-variant and is generated by a rotation of a basic reference code, (b) the plurality of streams of SS signal samples are generated from a received SS signal, which is a signal, possibly corrupted by noise and interference, composed by means of periodic repetition of a PN sequence, and (c) each of the correlators has N outputs and generates all N even-correlation lags once every sampling instant. Such an apparatus can be used for SS systems employing, for example, BPSK signals, or quadrature-phase-shift-keyed (QPSK) signals, multicarrier BPSK signals, multicarrier QPSK signals, or CPSK signals, each without data modulation embedded therein.

A third object of the invention is to provide a method and an apparatus including a combination of an even-correlation-lag generator and an odd-correlation-lag generator, for computing or generating all N even- and N odd-correlation lags between a rotating reference code and a received SS signal, wherein (a) the rotating reference code is time-variant and is generated by a rotation of a basic reference code, (b) the received SS signal is a signal composed by modulating data with the entirety of a PN sequence, (c) the even-correlation-lag generator has N outputs and generates N even-correlation lags once every sampling instant, and (d) the odd-correlation-lag generator has N outputs and generates N odd-correlation lags once every sampling instant. Such an apparatus can be used for SS systems employing, for example, BPSK signals, or CPSK signals, each with data modulation embedded therein.

A fourth object of the invention is to provide an apparatus including a plurality of sub-apparatuses, each of which is a combination of an even-correlation-lag generator and an odd-correlation-lag generator, for correlating a plurality of streams of SS signal samples with a rotating reference code and producing for each of the plurality of streams of SS signal samples all N even- and N odd-correlation lags once every sampling instant, wherein (a) the rotating reference code is time-variant and is generated by a rotation of a basic reference code, (b) the plurality of streams of SS signal samples are generated from a received SS signal, which is a signal, possibly corrupted by noise and interference, composed by means of modulating data with the entirety of a PN sequence, (c) each of the even-correlation-lag generators has N outputs and generates N even-correlation lags once every sampling instant, and (d) each of the odd-correlation-lag generators has N outputs and generates N odd-correlation lags once every sampling instant. Such an apparatus is useful for SS systems employing, for example, BPSK signals, QPSK signals, multicarrier BPSK signals, multicarrier QPSK signals, or CPSK signals, each having data modulation embedded therein.

A fifth object of the invention is to provide a method and an apparatus including one correlator for computing or generating M selected even-correlation lags (M<N) between a rotating reference code and a received SS signal, wherein (a) the rotating reference code is time-variant and is generated by a rotation of a basic reference code, (b) the SS signal is a signal, possibly corrupted by noise and interference, composed by means of periodic repetition of a PN sequence, and (c) the correlator has M outputs and generates M selected even-correlation lags once every sampling instant. Such an apparatus can be used for SS systems employing for example, BPSK signals, or CPSK signals, each without data modulation.

A sixth object of the invention is to provide an apparatus including a plurality of correlators, for correlating a plurality of streams of SS signal samples with a rotating reference code, wherein (a) the rotating reference code is time-variant and is generated by a rotation of a basic reference code, (b) the plurality of streams of SS signal samples are generated from a received SS signal, which is a signal, possibly corrupted by noise and interference, composed by means of periodic repetition of a PN sequence, and (c) each of the correlators has M outputs and generates M selected even-correlation lags once every sampling instant. Such an apparatus can be used for SS systems employing, for example, BPSK signals, QPSK signals, multicarrier BPSK signals, multicarrier QPSK signals, or CPSK signals, each without data modulation embedded therein.

A seventh object of the invention is to provide a method and an apparatus, including a combination of an even-correlation-lag generator and an odd-correlation-lag generator, for computing or generating M selected even- and M selected odd-correlation lags (M<N) between a rotating reference code and a received SS signal, wherein (a) the rotating reference code is time-variant and is generated by a rotation of a basic reference code, (b) the received SS signal is a signal composed by modulating data with the entirety of a PN sequence, (c) the even-correlation-lag generator has M outputs and generates M selected even-correlation lags once every sampling instant, and (d) the odd-correlation-lag generator has M outputs and generates M selected odd-correlation lags once every sampling instant. Such an apparatus can be used for SS systems employing, for example, BPSK signals, or CPSK signals, each with data modulation embedded therein.

An eighth object of the invention is to provide an apparatus including a plurality of sub apparatuses each of which is a combination of an even-correlation-lag generator and an odd-correlation-lag generator, for correlating a plurality of streams of SS signal samples with a rotating reference code and producing for each of the plurality of streams of SS signal samples M selected even- and M selected odd-correlation lags once every sampling instant, wherein (a) the rotating reference code is time-variant and is generated by a rotation of a basic reference code, (b) the plurality of streams of SS signal samples are generated from a received SS signal, which is a signal, possibly corrupted by noise and interference, composed by means of modulating data with the entirety of a PN sequence, (c) each of the even-correlation-lag generators has M outputs and generates M selected even-correlation lags once every sampling instant, and (d) each of the odd-correlation-lag generators has M outputs and generates M selected odd-correlation lags once every sampling instant. Such an apparatus is useful for SS systems employing, for example, BPSK signals, QPSK signals, multicarrier BPSK signals, multicarrier QPSK signals, or CPSK signals, each having data modulation embedded therein.

The method to generate $\bar{r}_n$ is based on the recursive relationship $$\bar{r}_n = \bar{r}_{n-1} + (d_n + d_{n-N})\bar{a}_n \quad (17)$$

where $a_n = [\alpha_{N-1,n}, \alpha_{N-2,n}, \ldots, \alpha_{0,n}]^T$ is the reference code for time n, given by $$\bar{a}_n = \bar{S}\bar{a}_{n-1}, n>0 \quad (18)$$

with $$\bar{a}_0 = [c_{N-1}, c_{N-2}, \ldots, c_0]^T \quad (19)$$

Based on knowing $\bar{r}_{n-1}$, this recursive relationship can be applied to generate $\bar{r}_n$. Initial conditions are set such that $\bar{r}_0 = 0$ and $d_0 = d_{-1} = \ldots = d_{-(N-1)} = 0$.

Figure 3:
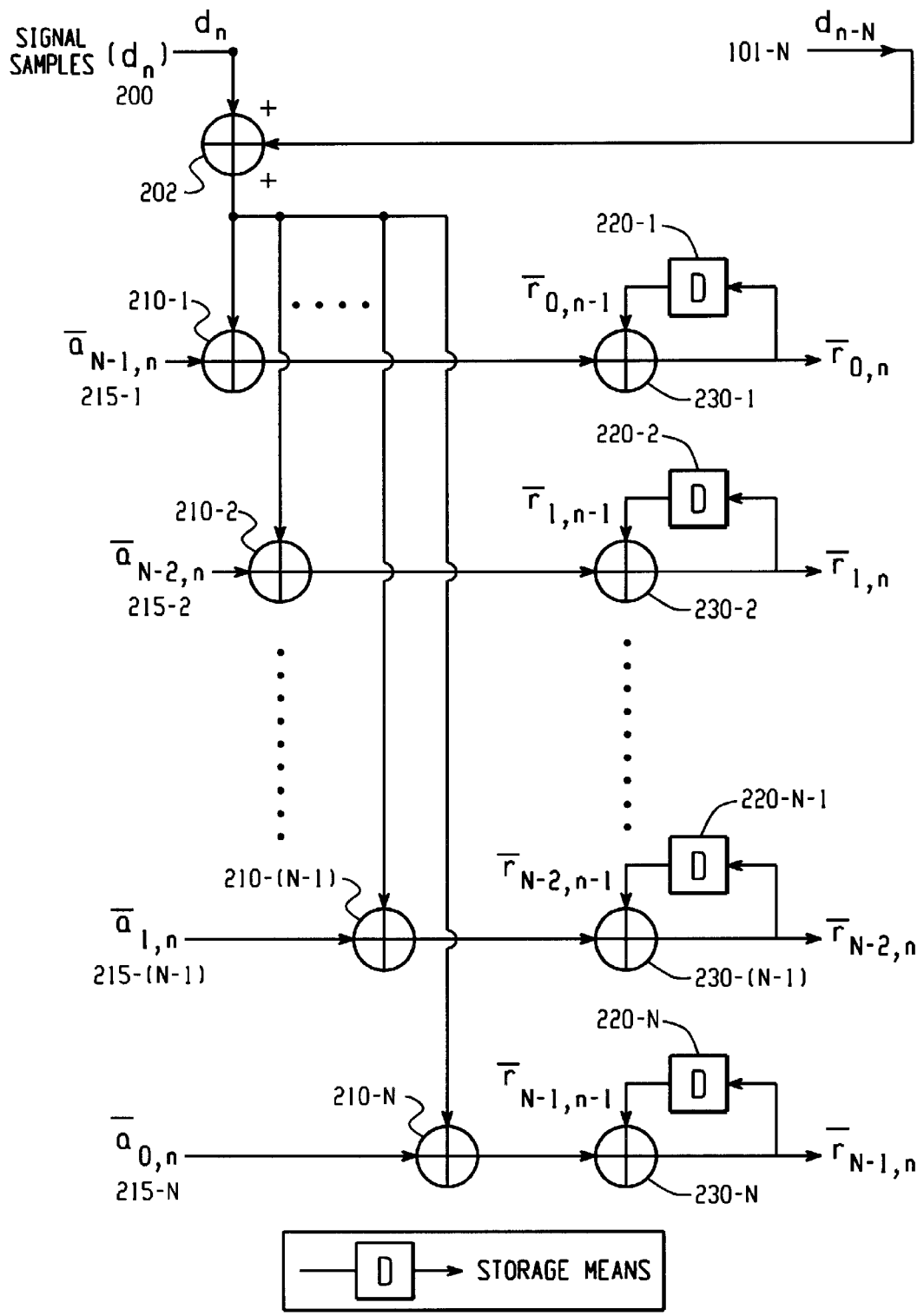
FIG. 3 is a diagram of an all-lag odd-correlation generator, which generates $\bar{r}_n$.

An all-lag odd-correlation generator is shown in FIG. 3. The apparatus consists of an addition means 202, a plurality of multipliers 210-1, 210-2, . . . , 210-N, a plurality of storage means 220-1, 220-2, . . . , 220-N (collectively referred to as 220), and a plurality of adders 230-1, 230-2, . . . , 230-N. The input SS signal samples are $d_1$, $d_2$, $d_3$, . . . and the output vectors are $\bar{r}_N$, $\bar{r}_{N+1}$, $\bar{r}_{N+2}$, . . . .

The incoming SS signal sample is fed from the port 200 to the input of addition means 202. The signal sample obtained at the nth previous sampling instant is available at the output of shift register 101-N. The outputs $\bar{r}_{0,n}$, $\bar{r}_{1,n}$, . . . , $\bar{r}_{N-1,n}$ computed or generated at the nth sampling instance are obtained at the outputs of adders 230-1, 230-2, . . . , 230-N, respectively. The outputs $\bar{r}_{0,n-1}$, $\bar{r}_{1,n-1}$, $\bar{r}_{2,n-1}$, . . . , $\bar{r}_{N-1,n-1}$ computed or generated at the (n−1)th sampling instant are stored in storage means 220-1, 220-2, . . . , 220-N, respectively, and are available at the outputs of respective storage means 220 at the nth sampling instant. Before $d_1$ is received, the values stored in 220 are reset to zero when the reset operation sets $d_0 = d_{-1} = \ldots = d_{-(N-1)} = 0$ and $\bar{r}_{0,0} = \bar{r}_{1,0} = \ldots = \bar{r}_{N-1,0} = 0$. Suppose that $d_n$ is fed into the apparatus. This signal sample is presented to the input of addition means 202. Another input of addition means 202 is connected to the output of shift register 101-N. The output of addition means 202 is connected to one of two inputs of multiplier 210-1, and is similarly connected to a plurality of multipliers 210-2, 210-3, . . . , 210-N. Other inputs of multipliers 210-1, 210-2, . . . , 210-N are connected to input ports 215-1, 215-2, . . . , 215-N, which provide values of

DETAILED DESCRIPTION OF THE PREFERRED EMBODIMENT

A method to generate $r_n$ is based on the recursive relationship $$r_n = r_{n-1} + (d_n - d_{n-N})a_n \quad (14)$$

where $a_n = [\alpha_{N-1,n}, \alpha_{N-2,n}, \ldots, \alpha_{0,n}]^T$ is the reference code for time n, given by $$a_n = Sa_{n-1}, n>0 \quad (15)$$

with $$a_0 = [c_{N-1}, c_{N-2}, \ldots, c_0]^T \quad (16)$$

Based on knowing $r_{n-1}$, this recursive relationship can be applied to generate $r_n$. Initial conditions are set such that $r_0 = 0$ and $d_0 = d_{-1} = \ldots = d_{-(N-1)} = 0$.

Figure 1:
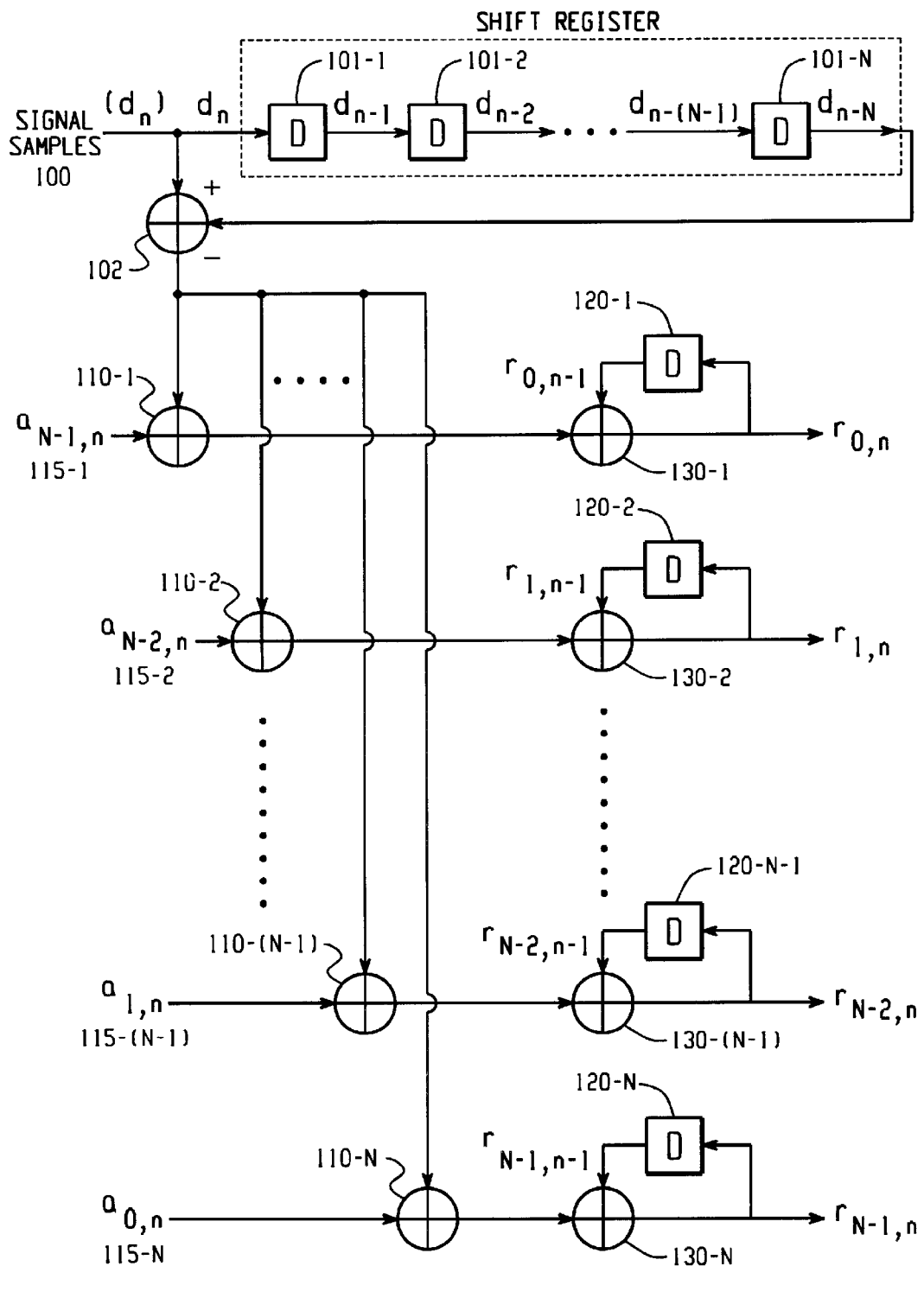
FIG. 1 is a diagram of an all-lag even-correlation generator, which generates $r_n$.

An all-lag odd-correlation generator is shown in FIG. 1. The apparatus consists of a plurality of storage means 101-1, 101-2, . . . , 101-N acting as a shift register (collectively referred to as 101) for storing SS signal samples, a subtraction means 102, a plurality of multipliers 110-1, 110-2, . . . , 110-N, a plurality of storage means 120-1, 120-2, . . . , 120-N (collectively referred to as 120), and a plurality of adders 130-1, 130-2, . . . , 130-N. The input SS signal samples are $d_1$, $d_2$, $d_3$, . . . and the desired output vectors are $r_N$, $r_{N+1}$, $r_{N+2}$, . . . .

The incoming SS signal sample is fed from the port 100 to the input of shift register 101-1 and the input of subtraction means 102. The signal sample obtained at the nth previous sampling instant step available at the output of shift register 101-N. The outputs $r_{0,n}$, $r_{1,n}$, . . . , $r_{N-1,n}$ computed or generated at the nth sampling instant are obtained at the outputs of adders 130-1, 130-2, . . . , 130-N, respectively. The outputs $r_{0,n-1}$, $r_{1,n-1}$, . . . , $r_{N-1,n-1}$ computed or generated at the (n−1)th sampling instant are stored in storage means 120-1, 120-2, . . . , 120-N, respectively, and are available at the outputs of respective storage means 120 at the nth sampling instant.

Before $d_1$ is received, the values stored in 101 and 120 are reset to zero when the reset operation sets $d_0 = d_{-1} = \ldots = d_{-(N-1)} = 0$ and $r_{0,0} = r_{1,0} = \ldots = r_{N-1,0} = 0$. Suppose now that $d_n$ is fed into the apparatus. This signal sample is presented to the input of subtraction means 102. Another input of the subtraction means 102 is connected to the output of 101-N. The output of subtraction means 102 is connected to one of two inputs of multiplier 110-1, and is similarly connected to a plurality of multipliers 110-2, 110-3, . . . , 110-N. Other inputs of multipliers 110-1, 110-2, . . . , 110-N are connected to input ports 115-1, 115-2, . . . , 115-N, which provides values of $\alpha_{N-1,n}$, $\alpha_{N-2,n}$, $\alpha_{N-3,n}$, . . . , $\alpha_{0,n}$, respectively, at the nth sampling instant. Outputs of multipliers 110-1, 110-2, . . . , 110-N are connected to inputs of adders 130-1, 130-2, . . . , 130-N, respectively. Other inputs of adders 130-1, 130-2, . . . , 130-N are connected to outputs of storage means 120-1, 120-2, . . . , 120-N, respectively. Inputs of storage means 120-1, 120-2, . . . , 120-N are connected to outputs of adders 130-1, 130-2, . . . , 130-N, respectively. Correlator outputs $r_{0,n}$, $r_{1,n}$, . . . , $r_{N-1,n}$ obtained at the nth time instant appear at outputs of adders 130-1, 130-2, . . . , 130-N, respectively.

For the case where M selected even-correlation lags are generated every sampling instance, M<N, the recursive relationship given by equation (14) indicates that the M selected even-correlation lags can be generated by a reduced even-correlation generator by deleting unused branches from the all-lag even-correlation generator depicted in FIG. 1. For example, if the mth even-correlation lag is not wanted to be generated, then multiplier 110-m, adder 130-m, and storage means 120-m are deleted. Operation of the reduced even-correlation generator is the same as that of the all-lag even-correlation generator.

Figure 2:
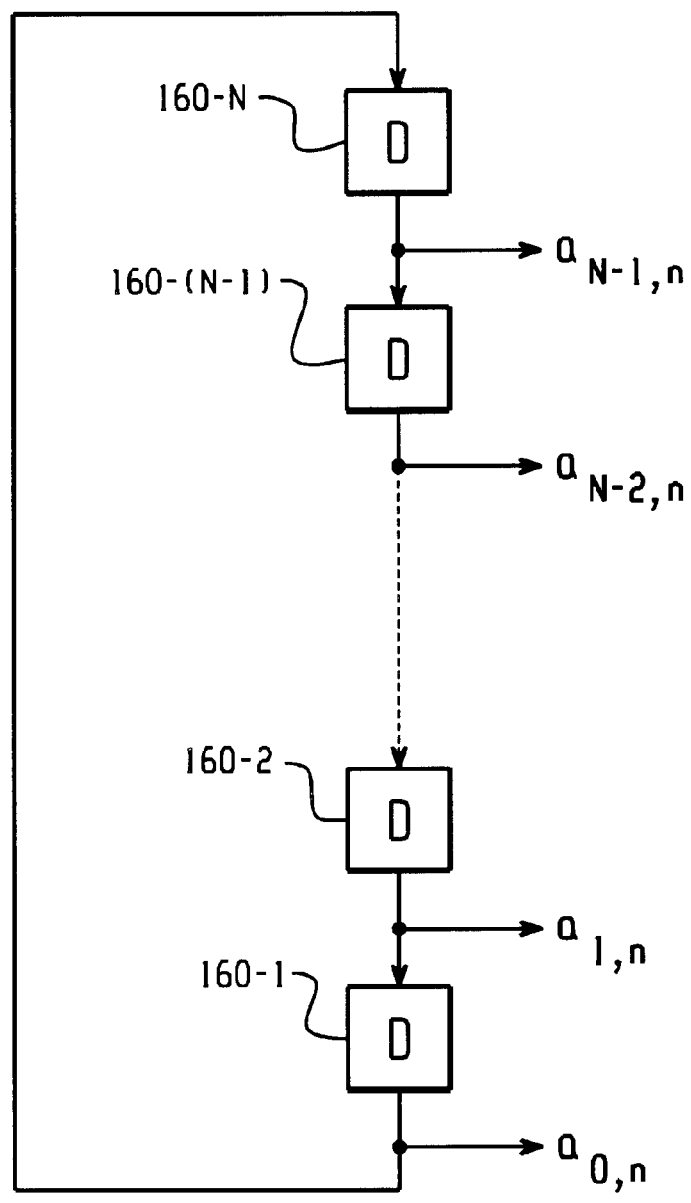
FIG. 2 is a diagram of a rotating-reference-code generator for generating the time-variant reference code at time n.

A rotating-reference generator that generates an at time n is depicted in FIG. 2. The generator includes N storage elements 160-1, 160-2, 160-3, . . . , 160-N acting as an end-around shift register collectively referred to as 160 for generating the rotating reference. Prior to operation, the storage elements 160-1, 160-2, 160-3, . . . , 160-N are initialized with values $c_0, c_1, c_2, \ldots, c_{N-1}$, respectively. $\overline{\alpha}_{N-1,n}, \overline{\alpha}_{N-2,n}, \overline{\alpha}_{N-3,n}, \ldots, \overline{\alpha}_{0,n}$, respectively, at the nth sampling instant. Outputs of the multipliers 210-1, 210-2, . . . , 210-N are connected to inputs of adders 230-1, 230-2, . . . , 230-N, respectively. Other inputs of the adders 230-1, 230-2, . . . , 230-N are connected to outputs of the storage means 220-1, 220-2, . . . , 220-N, respectively. Inputs of the storage means 220-1, 220-2, . . . , 220-N are connected to the outputs of the adders 230-1 230-2, . . . , 230-N, respectively. Correlator outputs $\overline{r}_{0,n}, \overline{r}_{1,n}, \ldots, \overline{r}_{N-1,n}$ obtained at the nth time instant are the outputs of the adders 230-1, 230-2, . . . , 230-N, respectively.

In the case where M selected odd-correlation lags are generated every sampling instant, M<N, the recursive relationship given by equation. (17) indicates that the M selected odd-correlation lags can be generated by a reduced odd-correlation generator by deleting unused branches from the all-lag odd-correlation generator depicted in FIG. 3. For example, if the mth odd-correlation lag is not wanted to be generated, then multiplier 210-m, adder 230-m, and storage means 220-m are deleted. Operation of the reduced odd-correlation generator is the same as that of the all-lag odd-correlation generator.

Figure 4:
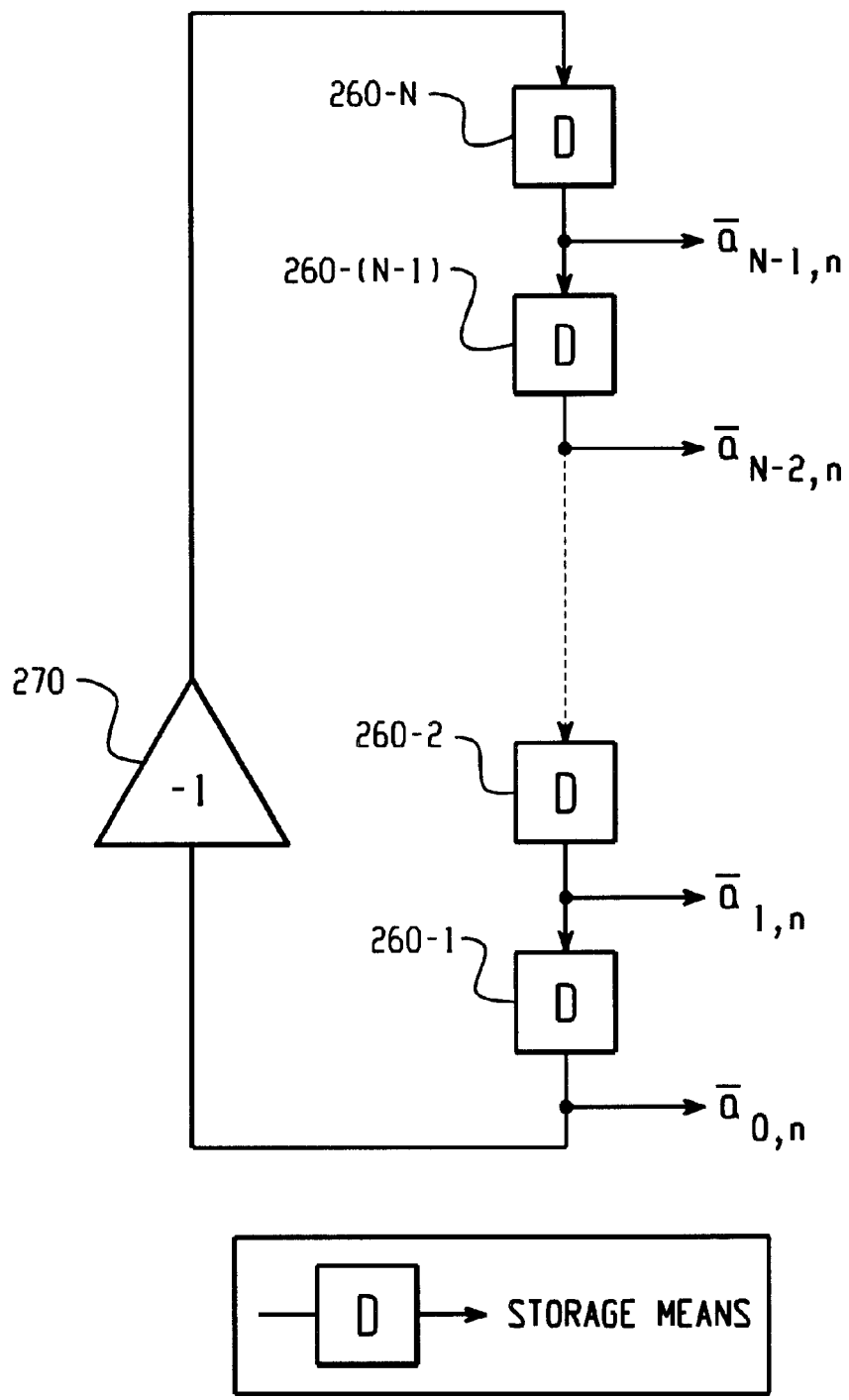
FIG. 4 is a diagram of a rotating-reference-code generator for generating the time-variant reference code at time n.

A rotating-reference generator that generates $\overline{a}_n$ at time n is as shown in FIG. 4. The generator includes N storage elements 260-1, 260-2, 260-3, . . . , 260-N acting as an inverting end-around shift register collectively referred to as 260 for generating the rotating reference, and a negator 270. Prior to operation, the storage elements 260-1, 260-2, 260-3, . . . , 260-N are initialized with values $c_0, c_1, C_2, \ldots, C_{N-1}$, respectively.

Figure 5:
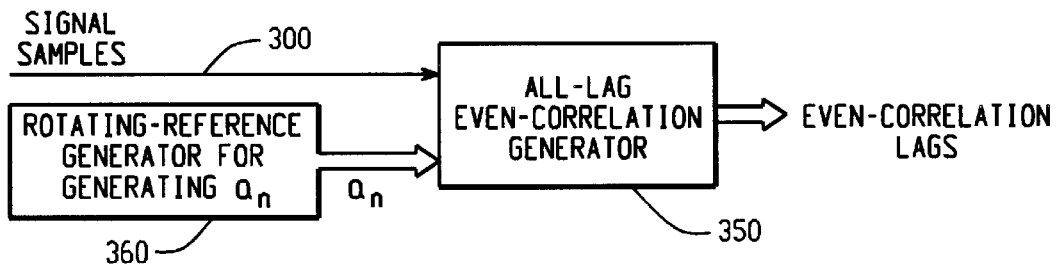
FIG. 5 is a diagram of an all-lag rotating-reference correlator for correlating a stream of SS signal samples with a rotating reference code.

An exemplary apparatus that accomplishes the first object of the invention is shown in FIG. 5, and includes an all-lag even-correlation generator 350, and a rotating-reference generator 360 for generating $a_n$ at time n. A stream of SS signal samples is fed into the apparatus from port 300. Even-correlation lags for the stream of SS signal samples are obtained as outputs of the all-lag even-correlation generator 350. The rotating-reference generator 360 provides values of $\alpha_{0,n}, \alpha_{1,n}, \ldots, \alpha_{N-1,n}$ at time n to the all-lag even-correlation generator 350. Q streams of SS signal samples are fed into the apparatus through ports 600-1, 600-2, . . . , 600-Q (collectively referred to as 600). Even-correlation lags for all streams are obtained as outputs of all-lag even-correlation generators 650-1, 650-2, . . . , 650-Q. Odd-correlation lags for all streams are obtained as outputs of the all-lag odd-correlation generators 655-1, 655-2, . . . , 655-Q. The rotating-reference generator 660 provides values of $\alpha_{0,n}, \alpha_{1,n}, \ldots, \alpha_{N-1,n}$ at time n to the Q all-lag even-correlation generators 650. The rotating-reference generator 665 provides values of $\overline{\alpha}_{0,n}, \overline{\alpha}_{1,n}, \ldots, \overline{\alpha}_{N-1,n}$ at time n to the Q all-lag odd-correlation generators 655.

Figure 9:
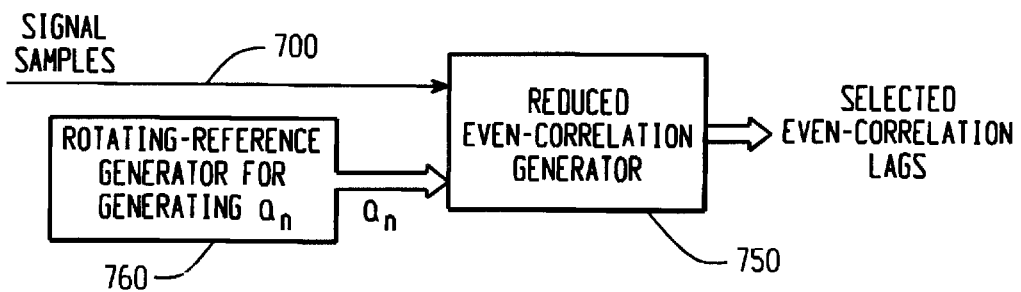
FIG. 9 is a diagram of a rotating-reference correlator for correlating a stream of SS signal samples with a rotating reference code and producing selected even-correlation lags.

An exemplary apparatus that accomplishes the fifth object of the invention is shown in FIG. 9, and includes a reduced even-correlation generator 750, and a rotating-reference generator 760 for generating $a_n$ at time n. A stream of SS signal samples is fed into the apparatus from port 700. Selected even-correlation lags for the stream of SS signal samples are obtained as outputs of the reduced even-correlation generator 750. The rotating-reference generator 760 provides values of $\alpha_{0,n}, \alpha_{1,n}, \ldots, \alpha_{N-1,n}$ at time n to the reduced even-correlation generator 750.

Figure 10:
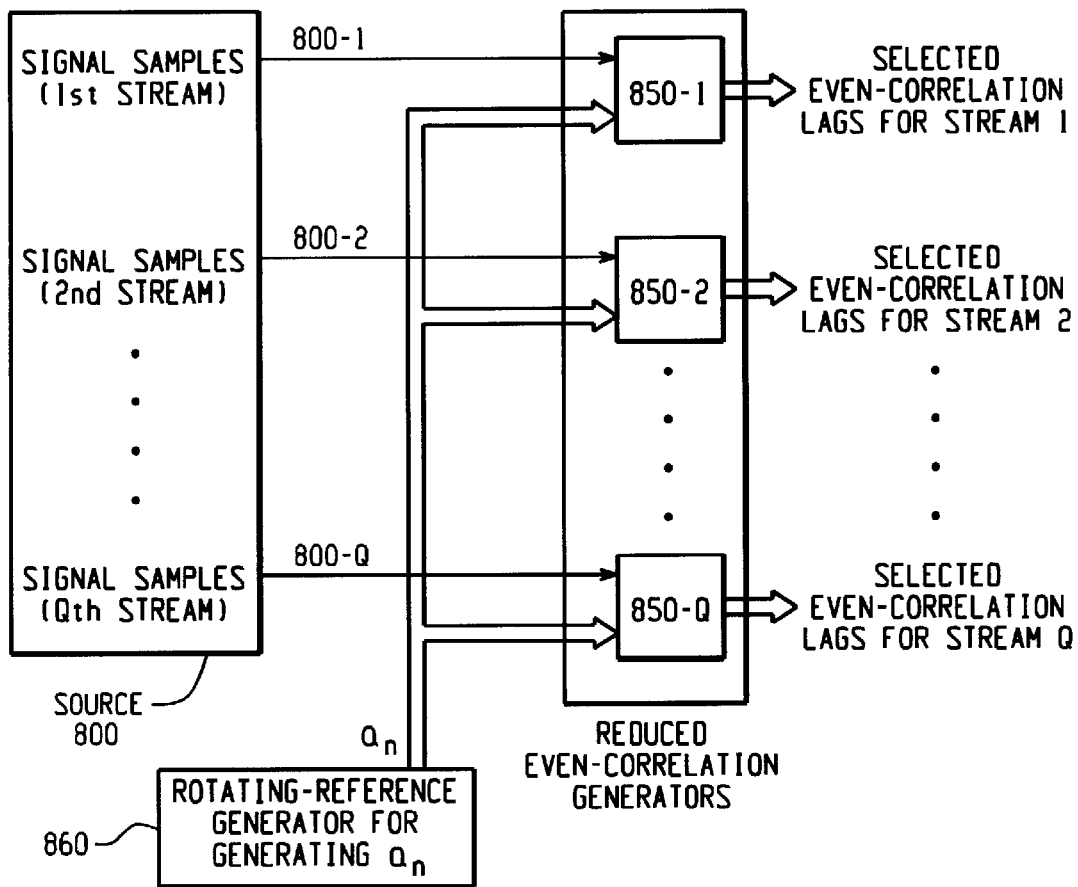
FIG. 10 is a diagram of a rotating-reference correlator for correlating a plurality of streams of SS signal samples with a rotating reference code.

An exemplary apparatus that accomplishes the sixth object of the invention is shown in FIG. 10, and includes a plurality of reduced even-correlation generators 850-1, 850-2, . . . , 850-Q (collectively called 850), and a rotating-reference generator 860 for generating $a_n$ at time n, wherein Q is the number of streams of SS signal samples to be correlated with the rotating reference code. The Q streams of SS signal samples are fed into the apparatus through ports 800-1, 800-2, . . . , 800-Q (collectively referred to as 800). Selected even-correlation lags for all streams are obtained as outputs of reduced even-correlation generators 850-1, 850-2, . . . , 850-Q. The rotating-reference generator 860 provides values of $\alpha_{0,n}, \alpha_{1,n}, \ldots, \alpha_{N-1,n}$ at time n to the Q all-lag even-correlation generators 850.

Figure 6:
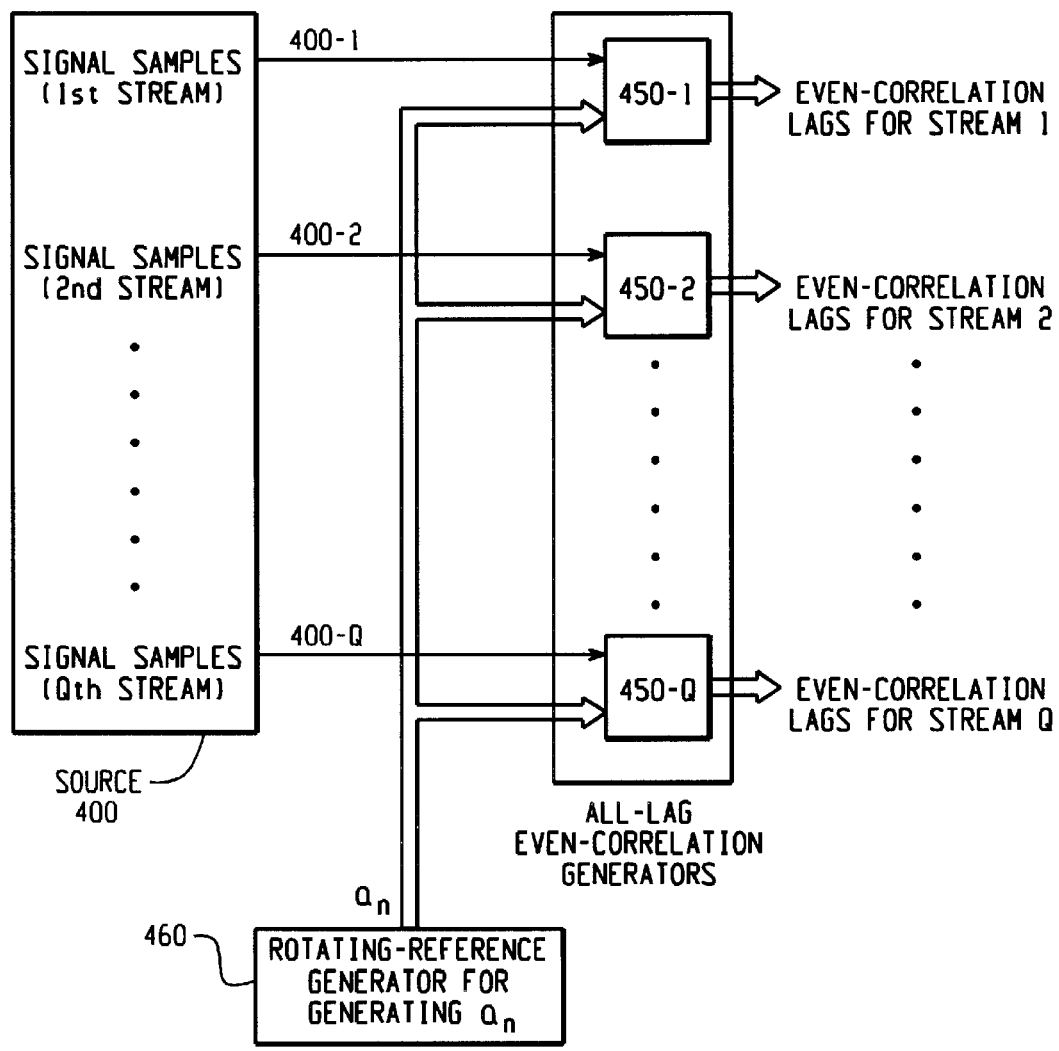
FIG. 6 is a diagram of an all-lag rotating-reference correlator for correlating a plurality of streams of SS signal samples with a rotating reference code.
Figure 11:
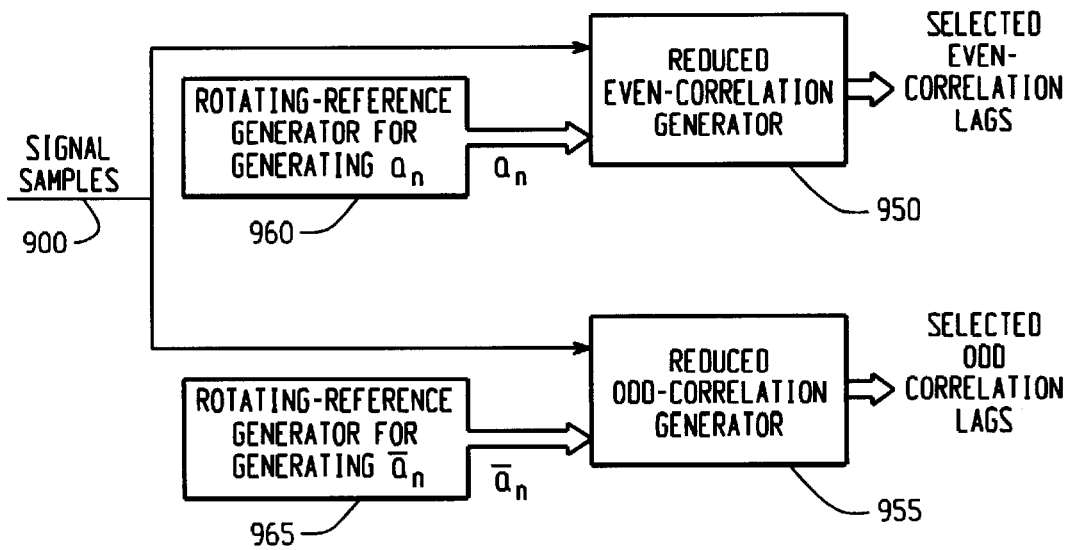
FIG. 11 is a diagram of a rotating-reference correlator for correlating a stream of SS signal samples with a rotating reference code and producing selected even- and selected odd-correlation lags.

An exemplary apparatus that accomplishes the seventh object of the invention is shown in FIG. 11, and includes a reduced even-correlation generator 950, a reduced odd-correlation An exemplary apparatus that accomplishes the second object of the invention is shown in FIG. 6 and includes a plurality of all-lag even-correlation generators 450-1, 450-2, . . . , 450-Q (collectively referred to as 450), and a rotating-reference generator 460 for generating an at time n, wherein Q is the number of streams of SS signal samples to be correlated with the rotating reference code. The Q streams of SS signal samples are fed into the apparatus through ports 400-1, 400-2, . . . , 400-Q (collectively referred to as 400). Even-correlation lags for all streams are obtained as outputs of the all-lag even-correlation generators 450-1, 450-2, . . . , 450-Q. The rotating-reference generator 460 provides values of $\alpha_{0,n}, \alpha_{1,n}, \ldots, \alpha_{N-1,n}$ at time n to the Q all-lag even-correlation generators 450.

Figure 7:
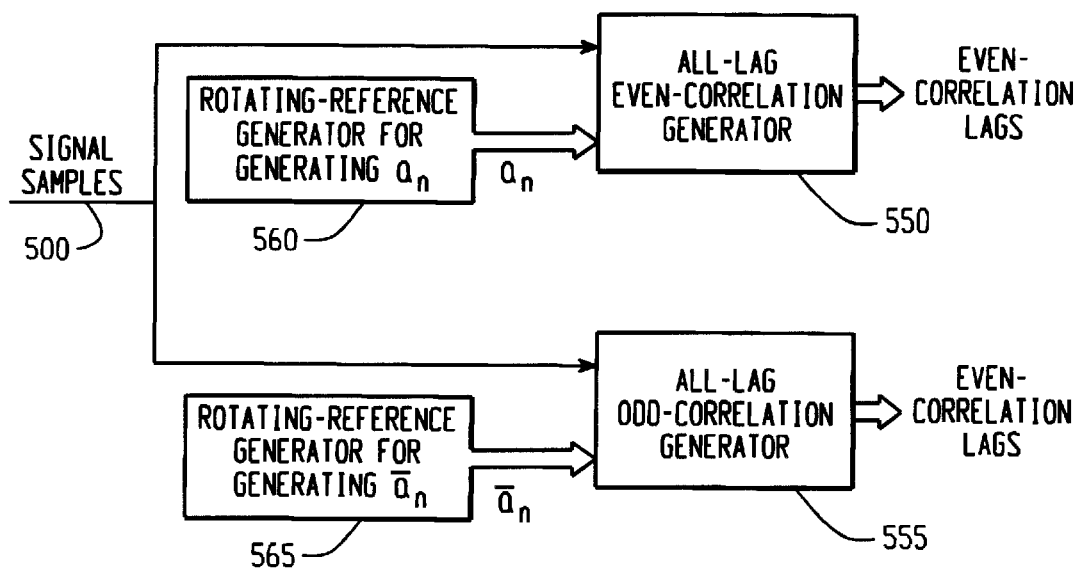
FIG. 7 is a diagram of an all-lag rotating-reference correlator for correlating a stream of SS signal samples with a rotating reference code.

An exemplary apparatus that accomplishes the third object of the invention is shown in FIG. 7, and includes an all-lag even-correlation generator 550, an all-lag odd-correlation generator 555, a rotating-reference generator 560 for generating $a_n$, and a rotating-reference generator 565 for generating $\overline{a}_n$. A stream of SS signal samples is fed into the apparatus from port 500, and is directed to the all-lag even- and odd-correlation generators 550 and 555. Even-correlation lags for the stream of SS signal samples are obtained as outputs of the all-lag even-correlation generator 550. Odd-correlation lags for the stream of SS signal samples are obtained as outputs of the all-lag odd-correlation generator 555. The rotating-reference generator 560 provides values of $\alpha_{0,n}, \alpha_{1,n}, \ldots, \alpha_{N-1,n}$ at time n to the all-lag even-correlation generator 550. The rotating-reference generator 565 provides values of $\overline{\alpha}_{0,n}, \overline{\alpha}_{1,n}, \ldots, \overline{\alpha}_{N-1,n}$ at time n to the all-lag odd-correlation generator 555.

Figure 8:
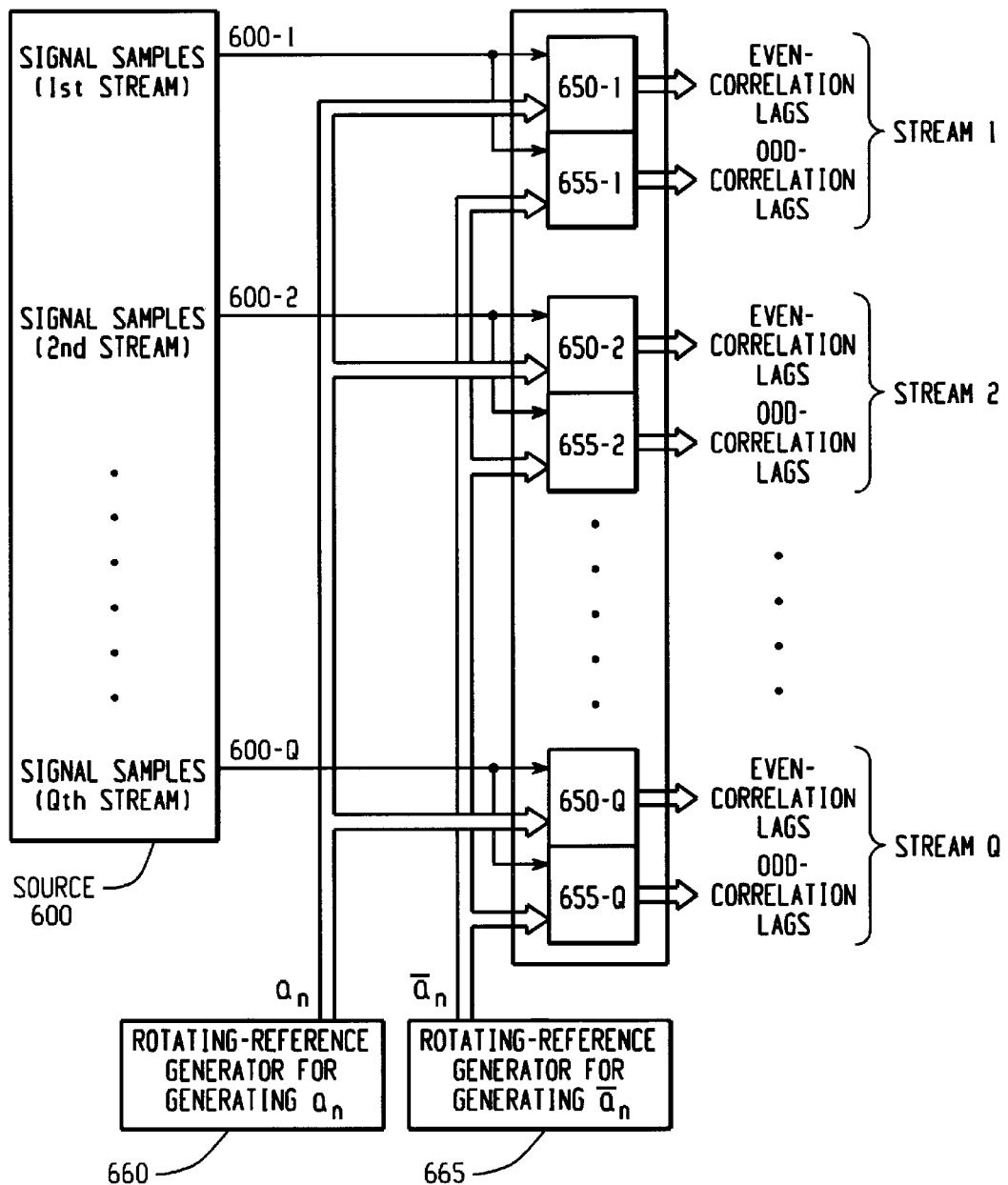
FIG. 8 is a diagram of an all-lag rotating-reference correlator for correlating a plurality of streams of SS signal samples with a rotating reference code.

An exemplary apparatus that accomplishes the fourth object of the invention is shown in FIG. 8, and includes a plurality of all-lag even-correlation generators 650-1, 650-2, . . . , 650-Q (collectively referred to as 650), a plurality of all-lag odd-correlation generators 655-1, 655-2, . . . , 655-Q (collectively referred to as 655), a rotating-reference generator 660 for generating $a_n$, and a rotating-reference generator 665 for generating $\overline{a}_n$, wherein Q is the number of streams of SS signal samples to be correlated with the rotating reference code. The generator 955, a rotating Preference generator 960 for generating $a_n$, and a rotating-reference generator 965 for generating $\bar{a}_n$. A stream of SS signal samples is fed into the apparatus from port 900, and is directed to the reduced even- and odd-correlation generators 950 and 955. Selected even-correlation lags for the stream of SS signal samples are obtained as outputs of the reduced even-correlation generator 950. Selected odd-correlation lags for the stream of SS signal samples are obtained as outputs of the reduced odd-correlation generator 955. The rotating-reference generator 960 provides values of $\alpha_{0,n}, \alpha_{1,n}, \ldots, \alpha_{N-1,n}$ at time n to the reduced even-correlation generator 950. The rotating-reference generator 965 provides values of $\bar{\alpha}_{0,n}, \bar{\alpha}_{1,n}, \ldots, \bar{\alpha}_{N-1,n}$ at time n to the reduced odd-correlation generator 955.

Figure 12:
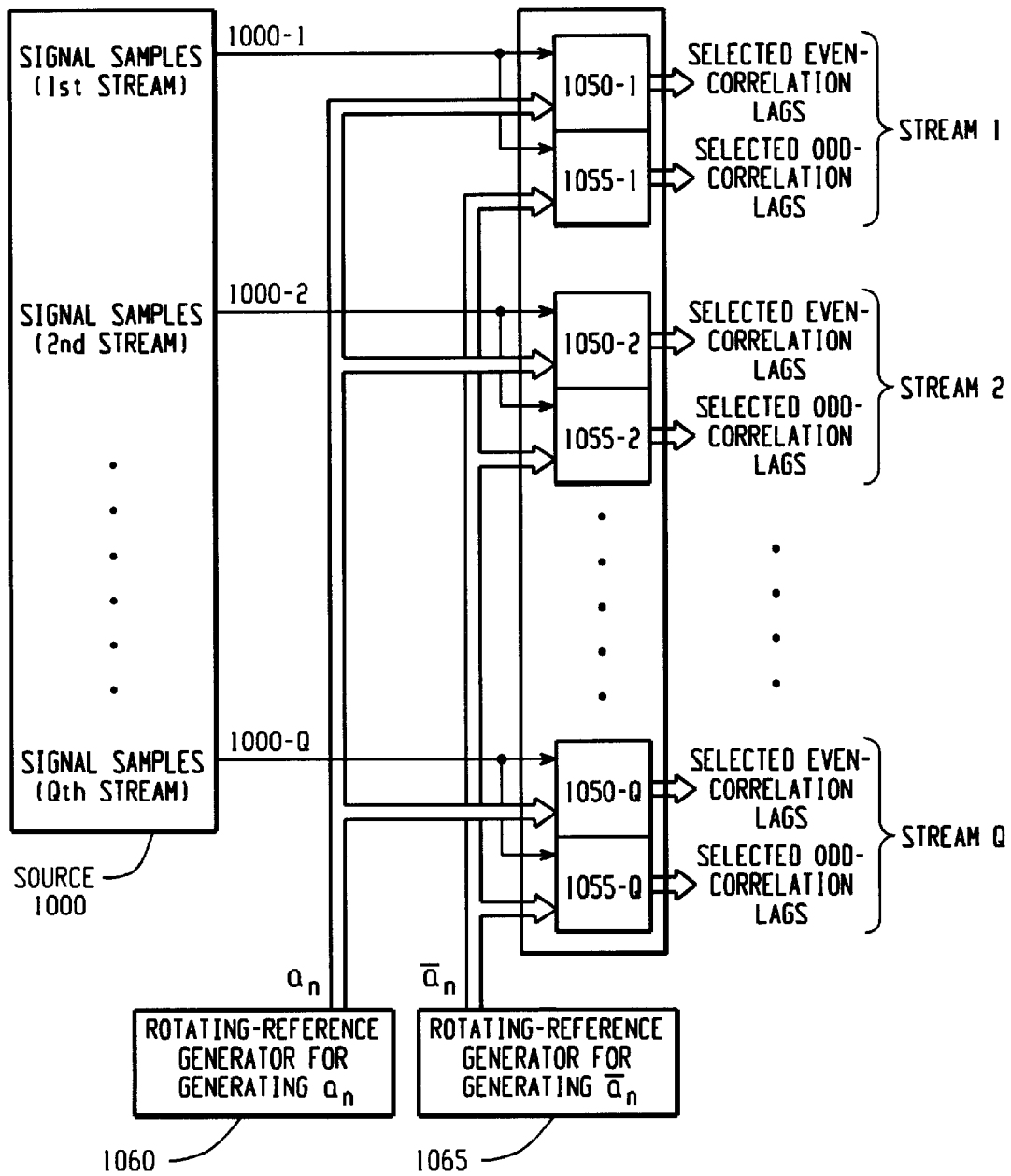
FIG. 12 is a diagram of a rotating-reference correlator for correlating a plurality of streams of SS signal samples with a rotating reference code.

An exemplary apparatus that accomplishes the eighth object of the invention is shown in FIG. 12, and includes a plurality of reduced even-correlation generators 1050-1, 1050-2, . . . , 1050-Q (collectively referred to as 1050), a plurality of reduced odd-correlation generators 1055-1, 1055-2, . . . , 1055-Q (collectively referred to as 1055), a rotating-reference generator 1060 for generating $a_n$, and a rotating-reference generator 1065 for generating $\bar{a}_n$, wherein Q is the number of streams of SS signal samples to be correlated with the rotating reference code. The Q streams of SS signal samples are fed into the apparatus through ports 1000-1, 1000-2, . . . , 1000-Q (collectively referred to as 1000). Selected even-correlation lags for all streams are obtained as outputs of reduced even-correlation generators 1050-1, 1050-2, . . . , 1050-Q. Selected odd-correlation lags for all streams are obtained as outputs of reduced odd-correlation generators 1055-1, 1055-2, . . . , 1055-Q. The rotating-reference generator 1060 provides values of $\alpha_{0,n}, \alpha_{1,n}, \ldots, \alpha_{N-1,n}$ at time n to the Q reduced even-correlation generators 1050. The rotating-reference generator 1065 provides values of $\bar{\alpha}_{0,n}, \bar{\alpha}_{1,n}, \ldots, \bar{\alpha}_{N-1,n}$ at time n to the Q reduced odd-correlation generators 1055.

It will be apparent to those skilled in the art that various modifications can be made to the apparatus described herein without departing from the scope and spirit of the invention. For example, the exemplary apparatus described herein could be used in a particular application, but may discard some of the outputs produced by the all-lag rotating-reference correlator, or may not use some/all outputs produced at some sampling instants. Furthermore, it will be apparent to those skilled in the art that the apparatus described herein can be implemented not only in the digital domain (i.e., using very large scale integration circuits to process the incoming SS signal that is digitized using an analog-to-digital converter), but also in the analog domain (viz., via using surface-acoustic-wave devices, charge-coupled devices or other equivalents) and also in software for execution in digital signal processor(s) or programmable device(s) or their equivalents.

The following is claimed:

1. An apparatus for correlating a stream of spread-spectrum signal samples with a rotating reference code, comprising:

spread spectrum signal storage means for storing the spread-spectrum signal samples at a present sampling instance and at a plurality of previous sampling instances;

subtraction means for calculating the difference between the present sampling instance and the plurality of previous sampling instances thus generating time lagged signal samples;

a plurality of multiplication means each computing the multiplication result for the output of the subtraction means and an element of the rotating reference code;

correlation lag storage means for storing correlation lags obtained at the previous sampling instance; and a plurality of addition means, coupled to outputs of the plurality of multiplication means and the correlation lag storage means, generating a correlation lag dependent on the previous sampling instance.

2. The apparatus of claim 1, wherein at least one of the spread spectrum signal storage means and the correlation lag storage means includes a surface-acoustic-wave (SAW) device.

3. The apparatus of claim 1, wherein at least one of the spread spectrum signal storage means and the correlation lag storage means includes a charge-coupled device (CCD).

4. The apparatus of claim 1, further comprising a rotating-reference generator including a plurality of storage elements configured as end-around shift registers.

5. The apparatus of claim 4, wherein the stream of spread-spectrum signal samples is generated from a received BPSK signal composed by means of periodic repetition of a PN sequence.

6. The apparatus of claim 4, wherein the stream of spread-spectrum signal samples is generated from a received CPSK signal composed by means of periodic repetition of a PN sequence.

7. The aparatus of claim 1, wherein the correlation lags are even-correlation lags.

8. The apparatus of claim 1, further including a negator such that the negator is configured to generate odd correlation lags.

9. An apparatus for correlating a plurality of streams of spread-spectrum signal samples with a rotating reference code, comprising:

spread spectrum signal storage means for storing the spread-spectrum signal samples at a current sampling instance and at a plurality of previous sampling instances;

subtraction means for calculating the difference between time-lagged signal samples;

a plurality of multiplication means each computing the multiplication result for the output of the subtraction means and an element of the rotating reference code;

correlation lag storage means for storing correlation lags obtained at the last previous sampling instance; and a plurality of addition means, coupled to outputs of the plurality of multiplication means and the even-correlation-lag storage means.

10. An apparatus of claim 9, wherein the plurality of streams of spread-spectrum signal samples are generated from a BPSK signal composed by means of periodic repetition of a PN sequence.

11. An apparatus of claim 9, wherein the plurality of streams of spread-spectrum signal samples are generated from a CPSK signal composed by means of periodic repetition of a PN sequence.

12. An apparatus of claim 9, wherein the plurality of streams of spread-spectrum signal samples are generated from a QPSK signal composed by means of periodic repetition of a PN sequence.

13. An apparatus of claim 9, wherein the plurality of streams of spread-spectrum signal samples are generated from a multicarrier BPSK signal each of subcarrier signals being composed by means of periodic repetition of a PN sequence.

14. An apparatus of claim 9, wherein the plurality of streams of spread-spectrum signal samples are generated from a multicarrier QPSK signal each of subcarrier signals being composed by means of periodic repetition of a PN sequence.

* * * * *